(12) United States Patent
Shimomura et al.

(10) Patent No.: US 6,738,164 B1
(45) Date of Patent: May 18, 2004

(54) COLOR IMAGE READING APPARATUS

(75) Inventors: Hidekazu Shimomura, Kawasaki (JP); Kazuyuki Kondo, Kawasaki (JP); Hiroshi Sato, Kawasaki (JP); Shinichi Arita, Fukuoka-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/501,521

(22) Filed: Feb. 9, 2000

(30) Foreign Application Priority Data

Feb. 12, 1999 (JP) .......................................... 11-033924

(51) Int. Cl.[7] .......................... H04N 1/04; H01L 27/00; H01J 40/14
(52) U.S. Cl. ...................... 358/474; 358/482; 358/483; 250/208.1; 250/226
(58) Field of Search ................................ 358/505, 482, 358/483; 250/208.1, 226

(56) References Cited

U.S. PATENT DOCUMENTS

| 4,991,030 | A |   | 2/1991  | Sato et al. ................... 358/474 |
| 5,187,358 | A | * | 2/1993  | Setani ....................... 250/208.1 |
| 5,471,321 | A | * | 11/1995 | Setani ........................ 358/474 |
| 5,670,205 | A |   | 9/1997  | Miyazaki et al. ............. 427/64 |
| 5,714,195 | A |   | 2/1998  | Shiba et al. ................. 427/140 |
| 5,844,233 | A |   | 12/1998 | Sato ......................... 250/208.1 |
| 5,973,814 | A | * | 10/1999 | Ohtake et al. .............. 359/210 |
| 5,982,511 | A |   | 11/1999 | Sato ........................... 358/475 |
| 6,141,118 | A |   | 10/2000 | Yamawaki et al. ......... 358/481 |
| 6,172,784 | B1 |  | 1/2001  | Konda ........................ 359/196 |

OTHER PUBLICATIONS

"Color Separation Gratings", H. Dammann, *Applied Optics*, Aug. 1, 1978, vol. 17, No. 15, p. A183 and pp. 2273–2279.

* cited by examiner

*Primary Examiner*—Edward Coles
*Assistant Examiner*—Houshang Safaipour
(74) *Attorney, Agent, or Firm*—Fitzpatrick, Cella, Harper & Scinto

(57) ABSTRACT

A color image reading apparatus comprises at least three line sensors arranged at regular intervals along the main scanning direction, an imaging optical system for focussing a light beam on the line sensors, and a diffraction grating for separating a light beam coming from a color image into a plurality of light beams having respective wavelengths different from each other. The imaging optical system includes at least one lens and the optical axis of the lens is eccentrically disposed relative to that of the optical system as a whole so as for the plurality of light beams to be focussed on the respective line sensors.

12 Claims, 6 Drawing Sheets

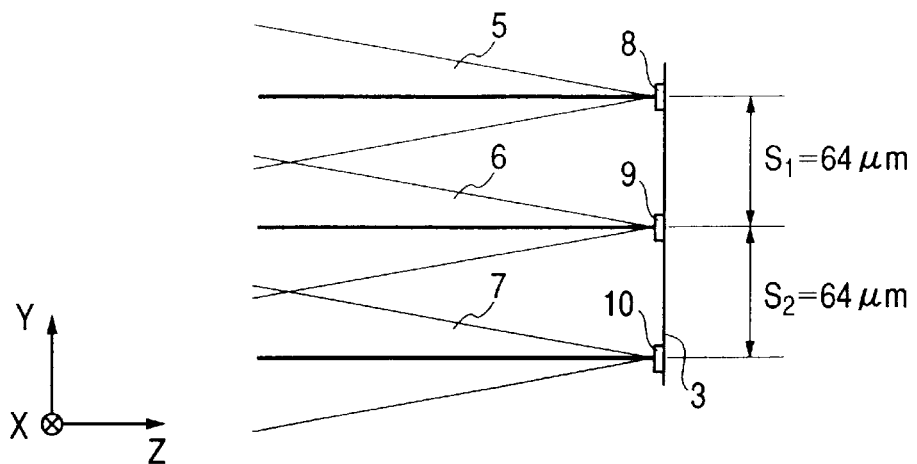
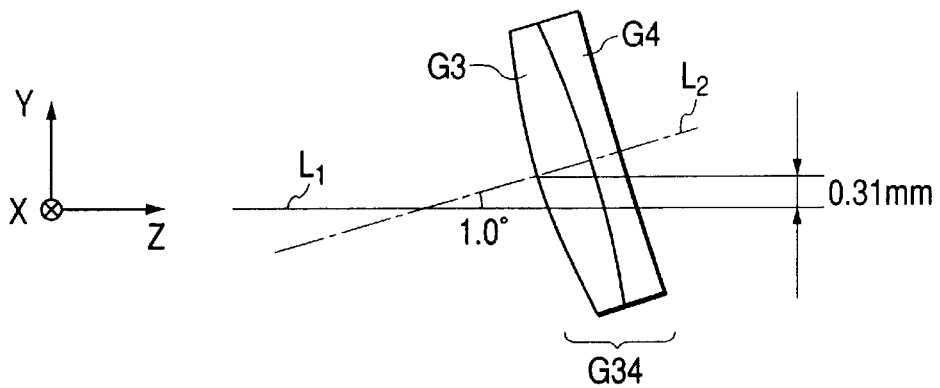
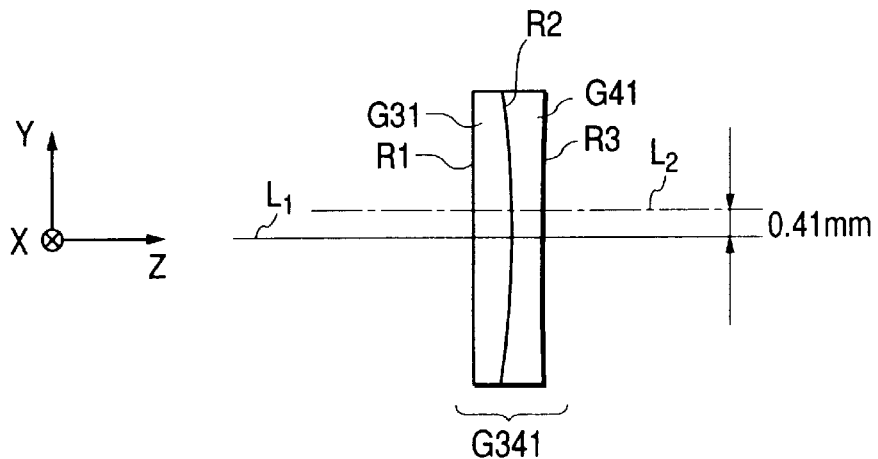

COLOR IMAGE READING APPARATUS

BACKGROUND OF THE INVENTION

1. Field of the Invention

This invention relates to a color image reading apparatus and, more particularly, it relates to a color image reading apparatus adapted to separate a light beam coming from a color image into a plurality of light beams having respective wavelengths different from each other by means of a diffraction grating and receive the light beams produced by the separation by means of at least three line sensors.

2. Related Background Art

Various color image reading apparatus have been proposed to date for reading digitized color image information from the output signal of a line sensor by forming a color image of an original on the line sensor having light receiving pixels arranged one-dimensionally along the main scanning direction of the apparatus by way of an optical system. Charge coupled devices (CCDs) are typically used for the line sensor.

FIG. 1 of the accompanying drawings is a schematic cross sectional view of a principal portion of a known color image reading apparatus taken along the sub-scanning direction thereof. In FIG. 1, the X-axis is arranged along the main scanning direction while the Y-axis is running along the sub-scanning direction that rectangularly intersects the main scanning direction. Referring to FIG. 1, the light beam of a color image coming from the surface of the original 61 is converged by a focussing lens 62 and separated into the three primary colors of red (R), green (G) and blue (B) by means of a 3P prism. Then, the light beams of the three primary colors are focussed respectively on line sensors 64, 65 and 66. Each of the line sensors has a plurality of detecting elements (light receiving pixels) arranged one-dimensionally along the main scanning direction so that the color image information is read from each of the light beams having different wavelengths as the color image is scanned along the sub-scanning direction by means of a scanning means such as a mirror (not shown).

However, a known color image reading apparatus as illustrated in FIG. 1 requires the use of a 3P prism that is prepared through an elaborate process to make the apparatus complex and costly. Further more, it is accompanied by various other problems including that the light beams produced by separate the incoming light beam by means of a 3P prism and the respective line sensors have to be positionally adjusted independently to make the entire operation of assembling the apparatus and regulating the performance thereof a very cumbersome one.

FIG. 2 is a schematic cross sectional view of a principal portion of another known color image reading apparatus taken along the sub-scanning direction thereof. The components same as those of FIG. 1 are denoted respectively by the same reference symbols and would not be described any further. In the apparatus of FIG. 2, the 3P prism of FIG. 1 is replaced by a pair of color separating beam splitters 74 and 75 provided with a wavelength selecting transmission film and adapted to divide the light beam converged by the focussing lens 62 into three light beams of the three primary colors that are separated from each other. The divided and separated three light beams are then focussed respectively on the three component line sensors of a monolithic 3-line sensor unit 73 arranged on the surface of a same substrate. Then, the color image information is read from the light beams having different wavelengths as the color image is scanned along the sub-scanning direction by means of a scanning means such as a mirror (not shown).

With the color image reading apparatus of FIG. 2, if the beam splitters 74 and 75 have a thickness of x, the distance separating the line sensors will be equal to $2\sqrt{2}x$. Then, if the desired distance separating the line sensors is between 0.064 and 0.2 mm, the beam splitters 74 and 75 should be made to show a thickness x between 23 and 70 $\mu$m.

Normally, it is highly difficult to prepare beam splitters that have such a small thickness and still maintain optically excellent planeness. Therefore, it is also highly difficult for an apparatus as shown in FIG. 2 to focus light beams on the respective line sensors without reducing their optical effectiveness.

FIG. 3 is a schematic cross sectional view of a principal portion of still another known color image reading apparatus taken along the sub-scanning direction thereof. The components same as those of FIG. 1 and FIG. 2 are denoted respectively by the same reference symbols and would not be described any further. In the apparatus of FIG. 3, the color image on the surface of the original 61 is read only by means of an objective lens 62 and a monolithic 3-line sensor unit 73 same as that of FIG. 2. FIG. 4 is a schematic perspective view of the monolithic 3-line sensor unit 73.

Referring to FIGS. 3 and 4, the monolithic 3-line sensor unit 73 has three component line sensors 81, 82 and 83 arranged in parallel with each other on a same substrate. Each of the line sensors typically comprises a charge coupled device having a plurality of detecting elements (light receiving elements) arranged one-dimensionally along the main scanning direction. If the line sensors 81 and 82 are separated from each other by a distance of $S_1$ and the line sensors 82 and 83 are separated from each other by a distance of $S_2$, both $S_1$ and $S_2$ are normally made to take a value between 0.064 and 0.2 mm in view of various manufacturing conditions. If the detecting elements (light receiving elements) 84 of the line sensors have a width $W_1$ in the main scanning direction and a width $W_2$ in the sub-scanning direction, they are normally made to take a value between 8 and 10 $\mu$m. If $W_1$ and $W_2$ are made equal to each other, a single detecting element may be made to have a size of 8 $\mu$m×8 $\mu$m or 10 $\mu$m×10 $\mu$m. The line sensors 81, 82 and 83 are provided thereon with color filters for transmitting only light beams of blue (B), green (G) and red (R) respectively.

Generally, the gap $S_1$ separating the line sensors 81 and 82 and the gap $S_2$ separating the line sensors 82 and 83 are made equal to each other and also equal to the value of the pixel size $W_2$ along the sub-scanning direction as shown in FIG. 4 multiplied by an integer for the reason as described below. Referring to FIG. 3, if only a focussing lens 62 is used to read the color image by means of a monolithic 3-line sensor unit as described above, the three line sensors 81, 82 and 83 will read the original 61 simultaneously at three different respective positions 81', 82' and 83'. Then, it is impossible to read simultaneously the signal components of the three primary colors (R, G, B) at any point on the original 61. This means that the signal components of the three primary colors have to be synthetically combined after reading them respectively by means of the three sensors.

This operation of synthetically combining the signal components of the three primary colors can be carried out advantageously by selecting each of the inter-line distances $S_1$, and $S_2$ of the three line sensors so as to be equal to the pixel size $W_2$ multiplied by an integer and using a corresponding redundancy line memory in order to delay, for example, the G and R signals (signal components for G and R) relative to the B signal (signal component for B). Thus, generally, $S_1$ and $S_2$ are made equal to each other and to $W_2$ multiplied by an integer.

Meanwhile, there have been proposed apparatus comprising a monolithic 3-line sensor unit and adapted to read a color image at a same position for the three primary colors without delaying any of the signal components. FIG. 5 is a schematic cross sectional view of a principal portion of such a known color image reading apparatus taken along the sub-scanning direction thereof. In FIG. 5, the components same as those of FIG. 4 are denoted respectively by the same reference symbols and would not be described any further.

Referring to FIG. 5, the light beam from a color image on the original 61 is converged by a focussing lens 62 and diffracted and color-separated into three light beams having respective wavelengths different from each other by means of a transmission type one-dimensional blazed diffraction grating 101. The three light beams produced by the color separation are then focussed on the respective line sensors of the monolithic 3-line sensor unit 73 so that the color signals for a given position of the original 61 can be read simultaneously. For instance, the color signal of red (R) will be detected by means of light of 0 order and that of green (G) will be detected by means of light of 1 order, while the color signal of blue (B) will be detected with light of −1 order.

However, a known color image reading apparatus as shown in FIG. 5 is accompanied by a problem as discussed below. Assume that the one-dimensional blazed diffraction grating 101 performs with a wavelength characteristic as illustrated in FIG. 6. Then, the angle of light of +1 order relative to light of 0 order would not agree with that of light of −1 order to give rise to a problem of asymmetry regardless of the selected pitch of the diffraction grating. Then, when a monolithic 3-line sensor unit 73 where three line sensors are arranged at regular intervals is used as described above, the focussed positions of the three light beams are displaced from the respective line sensors. While this problem may be dissolved by preparing a specifically designed 3-line sensor unit comprising three line sensors that are arranged at differentiated intervals for the color image reading apparatus, such a unit is highly costly.

SUMMARY OF THE INVENTION

Therefore, it is the object of the present invention to solve the above identified technological problems of the prior art and provide a color image reading apparatus that has a simple configuration and hence can be manufactured at low cost but is adapted to read color images highly accurately.

According to the invention, the above object is achieved by providing a color image reading apparatus comprising:

at least three line sensors arranged at regular intervals along the sub-scanning direction perpendicular to the main scanning direction, each having a plurality of light receiving pixels arranged along the main scanning direction;

an imaging optical system including at least one lens for focussing a light beam coming from a color image located at the reading position of the apparatus on said line sensors; and a diffraction grating for separating the light beam coming from said color image into a plurality of light beams having respective wavelengths different from each other;

the optical axis of the at least one lens of said imaging optical system being eccentrically disposed so as for said plurality of light beams produced by said diffraction grating to be focussed on the respective line sensors.

BRIEF DESCRIPTION OF THE DRAWINGS

FIG. 8 is a schematic cross sectional view of a principal portion of the first embodiment taken along the sub-scanning direction and showing the line sensors and the vicinity thereof in enlarged dimensions.

FIG. 9 is a schematic cross sectional view of a principal portion of the first embodiment taken along the sub-scanning direction and showing the location of the cemented lens of the first embodiment.

FIG. 11 is a schematic cross sectional view of a principal portion of the second embodiment taken along the sub-scanning direction and showing the location of the cemented lens of the first embodiment.

DETAILED DESCRIPTION OF THE PREFERRED EMBODIMENTS

Figure 7A:
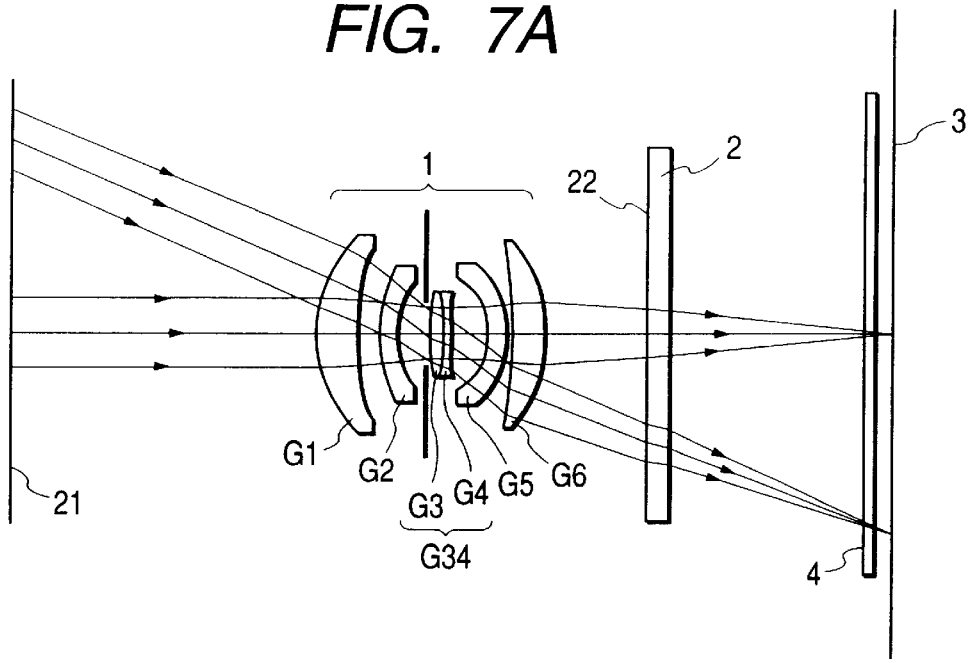
FIGS. 7A and 7B are schematic cross sectional views of the first embodiment of color image reading apparatus according to the invention taken along the main scanning direction and the sub-scanning direction respectively.
Figure 7B:
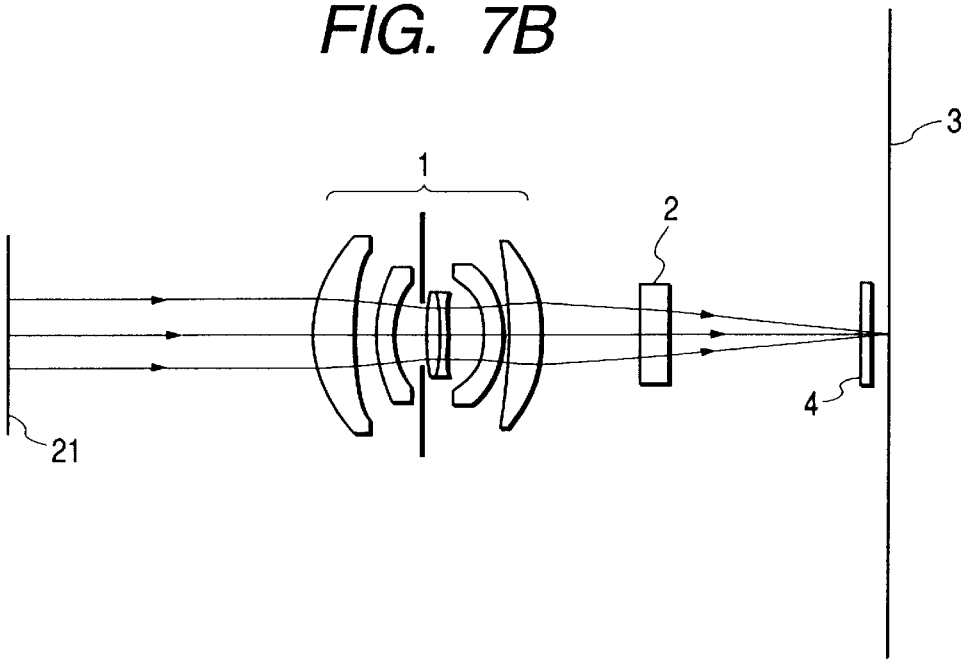

FIGS. 7A and 7B are schematic cross sectional views of the first embodiment of color image reading apparatus according to the invention taken along the main scanning direction and the sub-scanning direction respectively. FIG. 8 is a schematic cross sectional view of the line sensors of FIG. 7B and the vicinity thereof in large dimensions taken along the sub-scanning direction. FIG. 9 is a schematic cross sectional view of a principal portion of the first embodiment taken along the sub-scanning direction and showing the location of the cemented lens of the first embodiment.

In FIGS. 7A and 7B, reference symbol 21 denotes the surface of an original carrying thereon a color image and reference symbol 1 denotes an imaging optical system for focussing the light beam from the color image on a light receiving means 3 by way of a transmission type one-dimensional blazed diffraction grating, which will be discussed hereinafter.

The imaging optical system 1 of this embodiment comprises a total of six lenses including a positive lens G1, a negative lens G2, a positive lens G3, a negative lens G4, said positive lens G3 and said negative lens G4 forming a cemented lens G34, a negative lens G5 and a positive lens G6 arranged in the above mentioned order as viewed from the original 21. As seen from FIG. 9, the optical axis $L_2$ of the cemented lens G34 is displaced relative to the optical axis $L_1$ of the imaging optical system and then tilted. With this arrangement, the mutual displacement of the focussing positions of the light beams of predetermined colors (diffracted beams of light) produced by the one-dimensional blazed diffraction grating due to the difference of their wavelengths is corrected on the light receiving means 3. The cemented lens G34 is formed by bonding glass lenses G3 and G4 having respective Abbe's numbers that are significantly different from each other. Thus, this embodiment provides a strong effect of dispersion.

In FIGS. 7A and 7B, reference symbol 2 denotes a transmission type one-dimensional blazed diffraction grating arranged as color separation means. This one-dimensional blazed diffraction grating 2 separates the light beam entering it into light beams of predetermined colors, e.g., the three primary colors of red (R), green (G) and blue (B), along a direction perpendicular to the direction in which the pixels of the line sensors are arranged and transmits/diffracts them. In this embodiment, a beam of green light is obtained by light of +1 order 5 and a beam of red light and that of blue light are obtained respectively by light of 0 order 6 and that of −1 order 7. The one-dimensional blazed diffraction grating 2 is so arranged that the pitch of grating varies as a function of the distance from the axis within a cross section along the main scanning direction.

Figure 1:
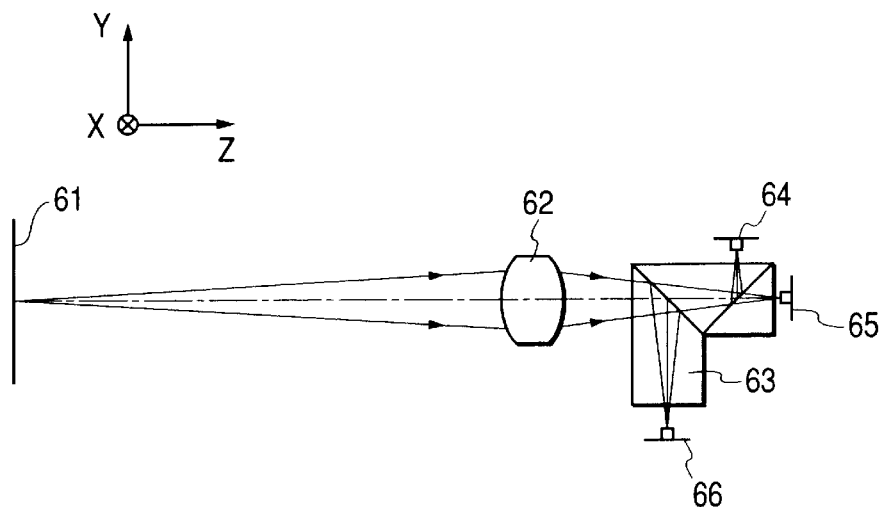
FIG. 1 is a schematic cross sectional view of a principal portion of a first known color image reading apparatus.
Figure 2:
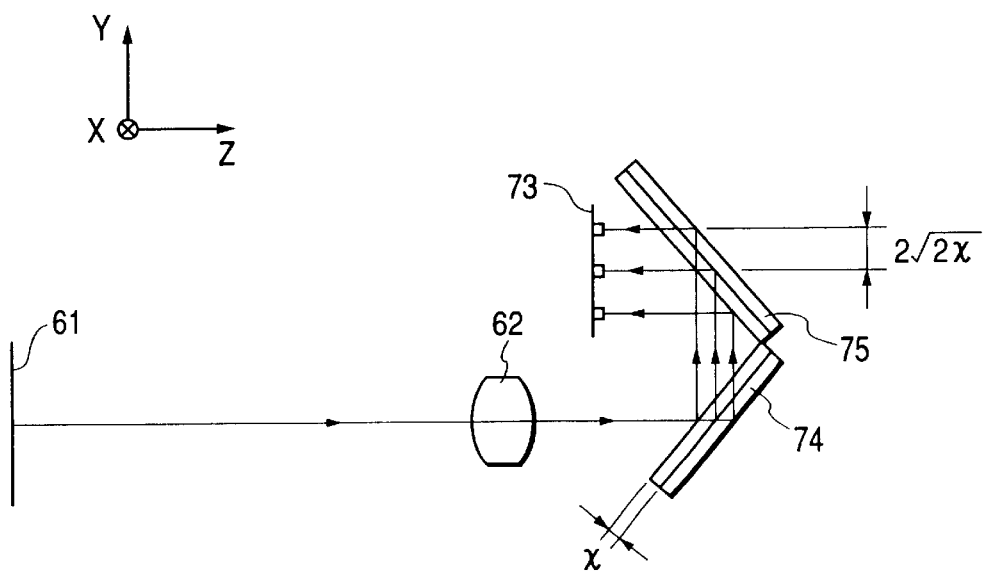
FIG. 2 is a schematic cross sectional view of a principal portion of a second known color image reading apparatus.
Figure 3:
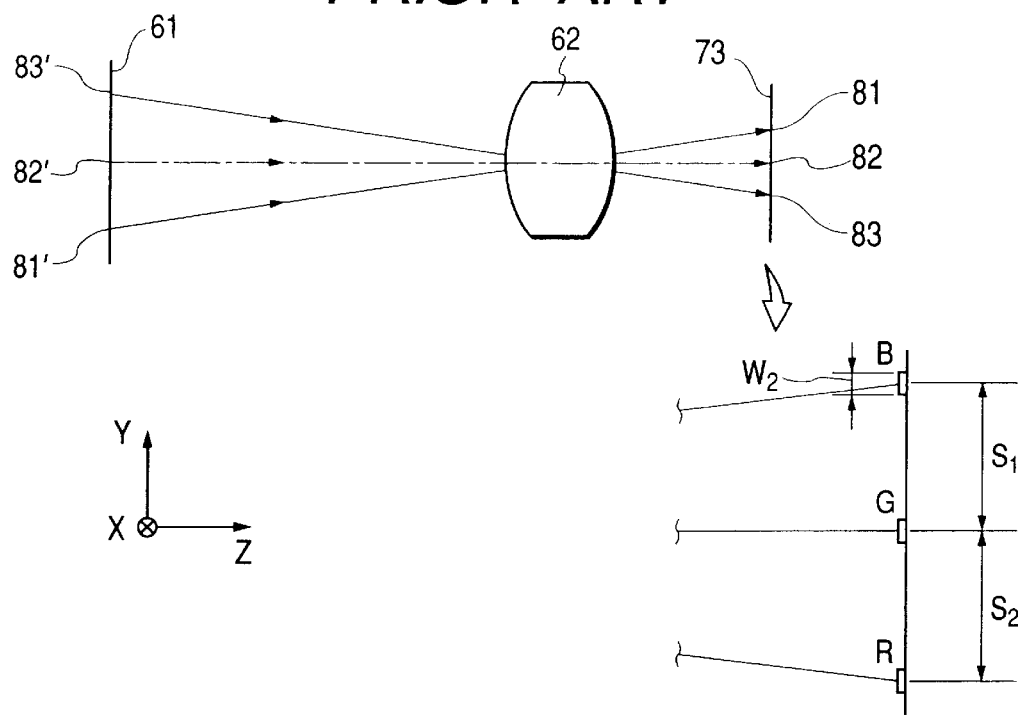
FIG. 3 is a schematic cross sectional view of a principal portion of a third known color image reading apparatus.
Figure 4:
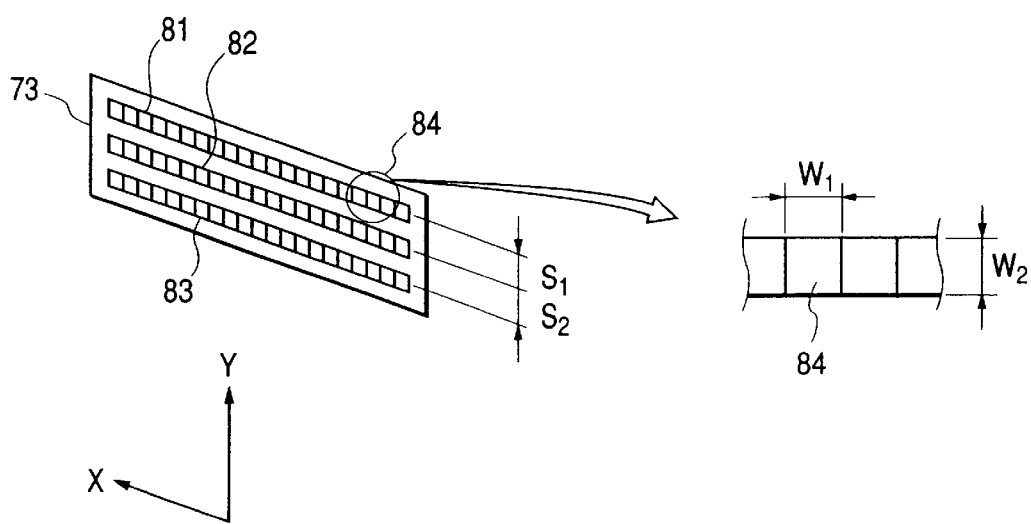
FIG. 4 is a schematic perspective view of the monolithic 3-line sensor unit of the apparatus of FIG. 3.
Figure 5:
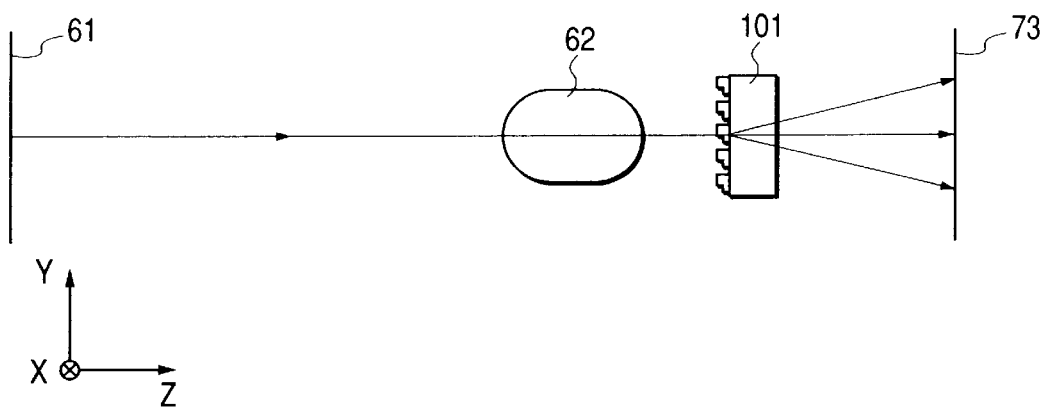
FIG. 5 is a schematic cross sectional view of a principal portion of a fourth known color image reading apparatus.
Figure 6:
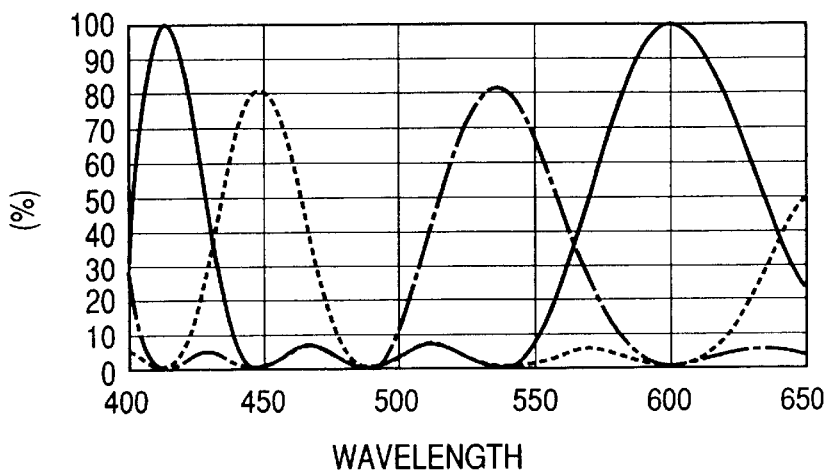
FIG. 6 is a spectral graph illustrating the diffraction performance of the diffraction grating of the apparatus of FIG. 5.

As seen from FIG. 8, the light receiving means 3 is formed by arranging three line sensors 8, 9 and 10 of CCDs in parallel with each other on a same substrate to produce a so-called monolithic 3-line sensor unit. The monolithic 3-line sensor unit has a configuration same as the one described above by referring to FIG. 4. Each of the detecting elements (light receiving pixels) of the line sensors has a size of 8 $\mu$m×8 $\mu$m. The distance $S_1$ separating the line sensors 8 and 9 is equal to the distance $S_2$ separating the line sensors 9 and 10, which is equal to eight times of the width of a light receiving pixel or 64 $\mu$m. Reference symbol 4 denotes a glass cover.

In this embodiment, the color image on the original 21 is scanned by a scanning means such as a mirror (not shown) and the light beam (optical information) from the color image is focussed by the imaging optical system 1 and separated into light beams of three colors (e.g., R, G, B) by means of the transmission type one-dimensional blazed diffraction grating 2. The produced light beams of the three colors are then focussed on the respective line sensors. As described above by referring to FIG. 9, the optical axis $L_2$ of the cemented lens G34 is displaced in parallel relative to the optical axis $L_1$ of the imaging optical system and then tilted. With this arrangement, the mutual displacement of the focussing positions of the light beams of predetermined colors (diffracted beams of light) produced along the sub-scanning direction by the one dimensional blazed diffraction grating is corrected on the light receiving means 3. Thus, an ordinary monolithic 3-line sensor unit having three line sensors arranged at regular intervals, which is by no means costly, can be used for the light receiving means 3 of this embodiment.

As described in "Applied Optics": Vol. 17, No. 15, pp. 2273–2279 (Aug. 1, 1978), a transmission type one-dimensional blazed diffraction grating that can be used as color separation means for the purpose of the invention is adapted to diffract the entering light beam and separate it mainly into three components in so many directions. In this embodiment, the light beam entering the one-dimensional blazed diffraction grating 2 is separated and divided into a diffracted light beam of +1 order 5, that of 0 order 6 and that of −1 order 7 as shown in FIG. 8. Then, the separated light beams are focussed respectively on the three line sensors of the light receiving means 3 as those of convergent spherical wave by means of the imaging optical system 1. As pointed out above, a beam of green light is obtained by light of +1 order 5 and a beam of red light and that of blue light are obtained respectively by light of 0 order and that of −1 order in this embodiment.

In this embodiment, the cemented lens G34 is formed by binding a spherical type positive lens G3 and a negative lens G4 together. The optical axis $L_2$ of the cemented lens G34 is displaced in parallel by 0.31 mm along the sub-scanning direction relative to the optical axis $L_1$ of the imaging optical system and then tilted by 1.0° relative to the optical axis $L_1$ of the imaging optical system. With this arrangement, the mutual displacement of the focussing positions of the light beams of the predetermined colors produced by the one-dimensional blazed diffraction grating 2 relative to the line sensors due to the difference of their wavelengths is corrected by differentiating the optical paths of the light beams of the different colors. Thus, the intervals $S_1$ and $S_2$ separating the beams of the different colors 5, 6 and 7 in the sub-scanning direction on the light receiving means 3 are made equal to each other.

While the displacement of the focussed spots on the line sensors of the light receiving means 3 (due to the asymmetry of the diffraction angles of the one-dimensional blazed diffraction grating 2) can be corrected either by displacing in parallel the optical axis $L_2$ of the cemented lens G34 relative to the optical axis of the imaging optical system or by tilting it relative to the optical axis $L_1$ of the imaging optical system, both the parallel displacement and the tilting are used in this embodiment in order to prevent the degradation of the MTF of the abaxial bundles (particularly that of blue color in this embodiment) due to the parallel displacement and obtain a uniform resolution between the on-axis and the most off-axis by tilting the optical axis $L_2$.

While the cemented lens G34 is eccentrically displaced in this embodiment, the present invention is by no means limited thereto and the displacement of the focussed spots can be corrected by eccentrically displacing any of the other lenses. However, it is desirable to eccentrically displace a lens having the smallest diffraction effect as in the case of this embodiment because the aberration of the optical system can be worsened when a lens having a greater refractive power is eccentrically displaced.

It may be needless to say that the imaging optical system 1 comprising six lenses that operate as five lenses in this embodiment may be replaced by some other appropriate optical system. Additionally, the lenses of the optical system 1 are not limited to spherical lenses and lenses whose diffraction effect is differentiated between the main scanning direction and the sub-scanning direction, aspherical lenses or cylindrical lenses may alternatively be used for the purpose of the invention. The cemented lens may be so configured that its refractive power is differentiated between the main scanning direction and the sub-scanning direction.

As described above, the transmission type one-dimensional blazed diffraction grating 2 of this embodiment is so arranged that the pitch of grating varies toward the off-axis direction from the on-axis within a cross section along the main scanning direction. Then, as shown in FIG. 7A, the distance between the plane 22 of the diffraction grating and the 3-line sensor unit 3 increases as the angle of view is increased. In order to color-separate a light beam at an invariable constant pitch between the on-axis and the most off-axis, the diffraction angle have to be varied taking the change in the distance into consideration. Thus, in this embodiment, the pitch of grating is made to vary toward the off-axis direction from the on-axis within a cross section along the main scanning direction.

However, the pitch of grating of the one-dimensional blazed diffraction grating 2 does not need to be varied if the imaging optical system 1 is an exit telecentric system.

Table 1 below shows some numerical values of the imaging optical system 1. In Table 1, $r_i$ is the radius of curvature of the i-th lens surface as counted from the object of observation and $d_i$ is the i-th lens thickness or air gap as counted from the object, whereas $nd_i$ and $\upsilon d_i$ are respectively the refractive index and the Abbe's number of the i-th lens as counted from the object.

TABLE 1

| i | $r_i$ | $d_i$ | $nd_i$ | $\upsilon d_i$ |
|---|---|---|---|---|
| 1 | 14.43272 | 4.33169 | 1.772499 | 49.60 |
| 2 | 33.42593 | 2.04584 | 1 | |
| 3 | 15.83838 | 1.93771 | 1.755199 | 27.51 |
| 4 | 9.90079 | 2.79471 | 1 | |
| 5 | 0 | 0.51406 | 1 | |
| 6 | 55.02924 | 1.25858 | 1.51633 | 64.14 |
| 7 | −28.90313 | 0.94666 | 1.72825 | 28.46 |
| 8 | 157.41649 | 3.29865 | 1 | |
| 9 | −6.63046 | 1.98014 | 1.784723 | 25.68 |
| 10 | −9.16999 | 0.59023 | 1 | |
| 11 | −40.50364 | 3.29383 | 1.772499 | 49.60 |
| 12 | −14.23444 | 10.62038 | 1 | |

Figure 10A:
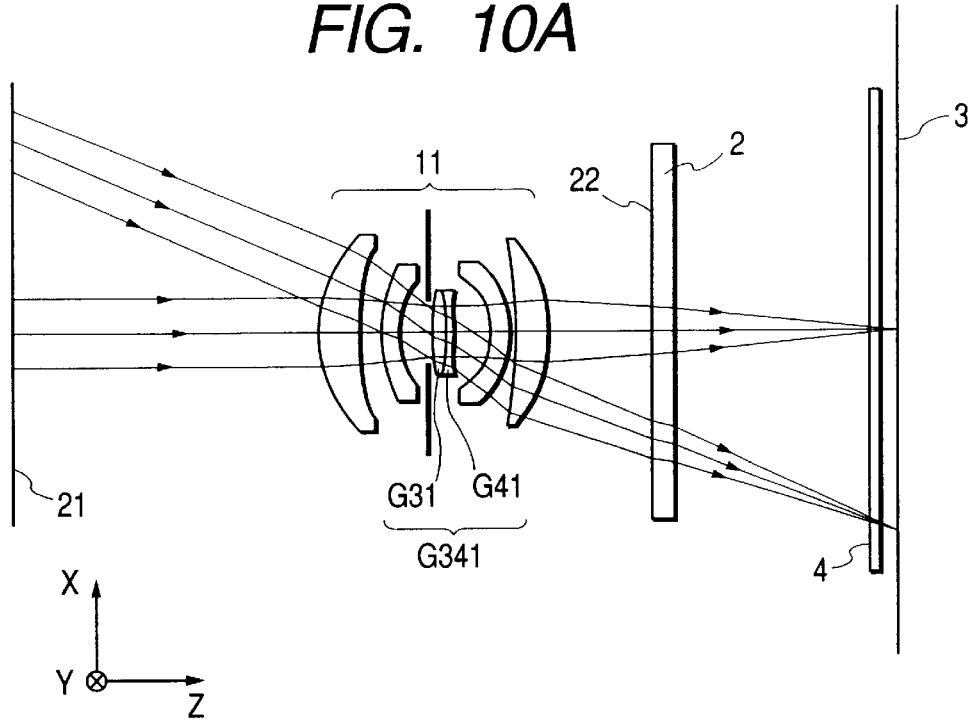
FIGS. 10A and 10B are schematic cross sectional view of the second embodiment of color image reading apparatus according to the invention taken along the main scanning direction and the sub-scanning direction respectively.
Figure 10B:
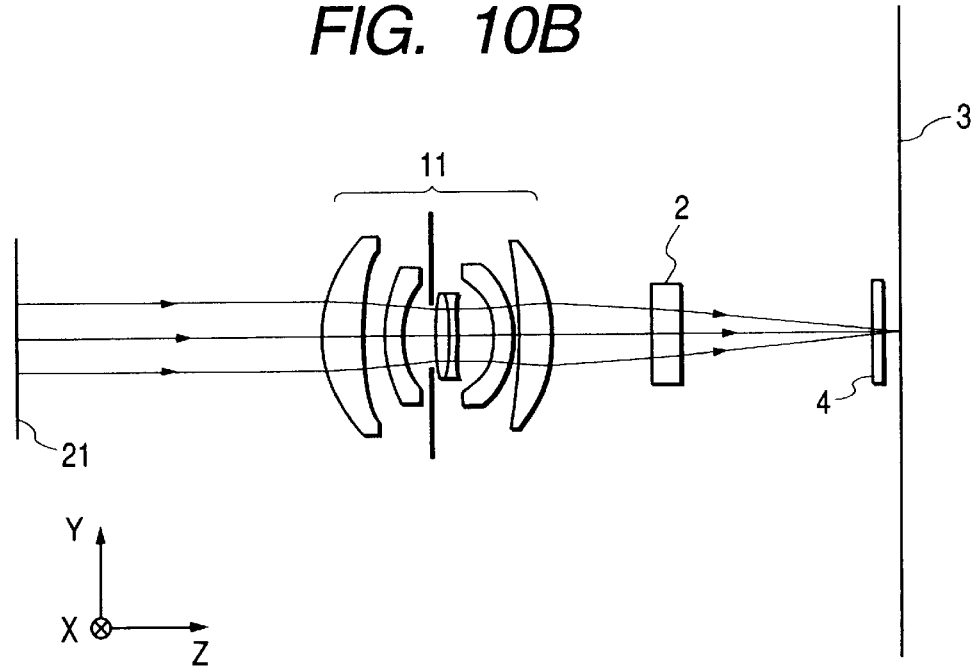

FIGS. 10A and 10B are schematic cross sectional view of the second embodiment of color image reading apparatus according to the invention taken along the main scanning direction and the sub-scanning direction respectively. FIG. 11 is a schematic cross sectional view of a principal portion of the second embodiment taken along the sub-scanning direction and showing the location of the cemented lens of the second embodiment. In FIGS. 10A, 10B and 11, the components that are same as those of their counterparts of FIGS. 7A, 7B and 9 are denoted respectively by the same reference symbols.

This second embodiment differs from the above described first embodiment only in that the cemented lens G341 of this embodiment is realized by binding a positive lens G31 and a negative lens G41 showing a substantially same refractive index relative to light having a given wavelength. In this embodiment, only the cemented interface R2 of the cemented lens G341 is displaced in parallel relative to the optical axis $L_1$ of the imaging optical system 11. Otherwise, this embodiment is same as the first embodiment particularly in terms of configuration and optical effects.

More specifically, the optical axis $L_2$ of the cemented lens G341 is displaced in parallel by 0.41 mm along the sub-scanning direction relative to the optical axis $L_1$ of the imaging optical system. With this arrangement, the mutual displacement of the focussing positions of the light beams of the predetermined colors produced on the light receiving means 3 by the one-dimensional blazed diffraction grating 2 relative to the line sensors due to the difference of their wavelengths is corrected by differentiating the optical paths of the light beams of the different colors. Thus, the intervals $S_1$ and $S_2$ separating the beams of the different colors 5, 6 and 7 in the sub-scanning direction on the monolithic 3-line sensor unit are made equal to each other. In FIG. 11, $L_1$ denotes the optical axis of surface R1 and surface R3 and $L_2$ denotes the optical axis of interface R2.

As in the case of the first embodiment, the cemented lens G341 of this embodiment is formed by binding glass lenses G31 and G41 having respective Abbe's numbers that are significantly different from each other. Thus, this embodiment provides a strong effect of dispersion like the first embodiment.

As for the materials of the two glass lenses G31 and G41, they preferably show a substantially same refractive index relative to light having a given wavelength from the viewpoint of preventing any undesired degradation of the focussing performance of the lens unit, although the mutual displacement of the focussing positions can be corrected if they do not show a substantially same refractive index. The profile of the cemented lens and the configuration of the lenses of the imaging optical system of this embodiment are not limited to those described above as in the case of the first embodiment.

While the interface of the component lenses of the cemented lens of this embodiment is displaced in parallel relative to the optical axis of the imaging optical system, a similar effect can be achieved by tilting it relative to the optical axis of the imaging optical system.

Table 2 below shows some numerical values of the imaging optical system 11. In Table 2, $r_i$ is the radius of curvature of the i-th lens surface as counted from the object of observation and $d_i$ is the i-th lens thickness or air gap as counted from the object, whereas $nd_i$ and $\upsilon d_i$ are respectively the refractive index and the Abbe's number of the i-th lens as counted from the object.

TABLE 2

| i | $r_i$ | $d_i$ | $nd_i$ | $\upsilon d_i$ |
|---|---|---|---|---|
| 1 | 14.80465 | 3.99 | 1.772499 | 49.60 |
| 2 | 32.35358 | 2.4 | 1 | |
| 3 | 15.19252 | 1.87 | 1.784723 | 25.68 |
| 4 | 10.33675 | 3.34 | 1 | |
| 5 | 0 | 0.32 | 1 | |
| 6 | 1057.4751 | 1.48 | 1.696797 | 55.53 |
| 7 | −20.57 | 0.94 | 1.698947 | 30.13 |
| 8 | 944.55993 | 4.37 | 1 | |
| 9 | −6.63825 | 1.86 | 1.784723 | 25.68 |
| 10 | −8.98013 | 0.66 | 1 | |
| 11 | −33.98013 | 3.71 | 1.772499 | 49.60 |
| 12 | −14.22471 | 8 | 1 | |

The present invention is by no means limited to the above described embodiments. For instance, the number of line sensors to be used in a color image reading apparatus according to the invention is not limited to three but four or more than four line sensors may be used in a color image reading apparatus according to the invention. Similarly, the diffraction grating is not limited to the transmission type and a diffraction grating of the reflection type may alternatively be used. Any such variations and modifications are within the scope of the present invention as defined by claims that follow.

What is claimed is:

1. A color image reading apparatus comprising:
   at least three line sensors arranged at regular intervals along the sub-scanning direction perpendicular to the main scanning direction, each having a plurality of light receiving pixels arranged along the main scanning direction;
   an imaging optical system including at least one lens for focusing a light beam coming from a color image located at the reading position of the apparatus on said line sensors; and
   a diffraction grating for separating the light beam coming from said color image into a plurality of light beams having respective wavelengths different from each other in the sub-scanning direction, the optical axis of the at least one lens of said imaging optical system being eccentrically disposed within a cross section along the sub-scanning direction so as for said plurality of light beams produced by said diffraction grating to be focused on the respective line sensors at regular intervals.

2. A color image reading apparatus according to claim 1, wherein said imaging optical system comprises a plurality of lenses and the optical axis of part of the lenses is displaced in parallel relative to the optical axis of the imaging optical system.

3. A color image reading apparatus according to claim 2, wherein said optical axis displaced in parallel is further displaced as tilted relative to the optical axis of the imaging optical system.

4. A color image reading apparatus according to claim 1, wherein said imaging optical system comprises a plurality of lenses and the optical axis of part of the lenses is displaced as tilted relative to the optical axis of the imaging optical system.

5. A color image reading apparatus according to any of claims 1 through 4, wherein the refractive power of said eccentrically disposed lens in the main scanning direction differs from that of said lens in the sub-scanning direction.

6. A color image reading apparatus according to any of claims 1 through 4, wherein said eccentrically disposed lens is a cemented lens.

7. A color image reading apparatus according to claim 6, wherein the optical axis of the cemented interface of said cemented lens is disposed eccentrically relative to the optical axis of the imaging optical system within a cross section along the sub-scanning direction.

8. A color image reading apparatus according to claim 6, wherein the refractive power of said cemented lens in the main scanning direction differs from that of said cemented lens in the sub-scanning direction.

9. A color image reading apparatus according to claim 6, wherein said cemented lens is formed by bonding a pair of lenses showing a substantially same refractive index relative to light having a given wavelength.

10. A color image reading apparatus according to claim 1, wherein said diffraction grating comprises a one dimensional blazed diffraction grating.

11. A color image reading apparatus according to claim 10, wherein said diffraction grating comprises a transmission type one-dimensional blazed diffraction grating.

12. A color image reading apparatus according to claim 1, wherein said at least three line sensors are formed on a same substrate.

* * * * *